United States Patent [19]

Stöger

[11] Patent Number: 5,135,111
[45] Date of Patent: Aug. 4, 1992

[54] HOLDER FOR A CASSETTE

[75] Inventor: Anton Stöger, Vienna, Austria

[73] Assignee: U.S. Philips Corporation, New York, N.Y.

[21] Appl. No.: 789,514

[22] Filed: Nov. 8, 1991

[30] Foreign Application Priority Data

Apr. 29, 1991 [AT] Austria .................................. 890/91

[51] Int. Cl.⁵ .......................................... B65D 85/575
[52] U.S. Cl. .................................. 206/387; 206/307; 206/591
[58] Field of Search ............... 206/307, 309, 312, 387, 206/591

[56] References Cited

U.S. PATENT DOCUMENTS

| 4,203,519 | 5/1980 | Fujitaki | 206/387 |
| 4,253,567 | 3/1981 | Goldammer | 206/387 |
| 4,383,610 | 5/1983 | Boshears | 206/387 |
| 4,819,797 | 4/1989 | Holmgren | 206/309 |

FOREIGN PATENT DOCUMENTS 0050362  3/1982  Japan .................................. 206/387

Primary Examiner—Jimmy G. Foster

[57] ABSTRACT

A rectangular holder (1) has two main walls (2,3) and three side walls (4,5,6) and is open at a fourth side (7) and comprises a clamping member (11) for clamping a cassette in the holder (1), which clamping member is situated at the location of at least one side (4) adjacent the open side and is made of an elastic material. The clamping member has an internal cavity substantially at the location which projects into the holder interior.

7 Claims, 2 Drawing Sheets

HOLDER FOR A CASSETTE

The invention relates to a holder of rectangular shape which comprises two main walls and three side walls interconnecting the two main walls, and is open at a fourth side, which holder is adapted to receive through the open side a rectangular cassette with a record carrier contained therein and, at the location of at least one side wall adjacent the open side, comprises a clamping member for clamping a cassette inserted in the holder, which clamping member is connected to the holder at the location of said side wall, traverses said side wall, and comprises a part which projects into the holder interior, which member is made of an elastic material and, can be partly deformed elastically by a cassette inserted in the holder.

For such a holder, as developed by the Applicant and described in the Ser. No. 701,551, filed May 16,1991, herewith incorporated by reference, it has been proposed to make the clamping member of elastomeric material. When a cassette is inserted into the holder and cooperates with the clamping member elastic deformations occur. The clamping member is elastic and extends through the relevant side wall, the externally visible area in the holder being flush with the relevant side wall in the absence of a cassette. The part projecting outwardly from the side wall may form a bulge, which is undesirable because such a bulge increases the likelihood of the clamping member being removed inadvertently and is also undesirable for cosmetic reasons. Also, a bulge will present a space-saving stacking of the passages, which may be particularly unacceptable in automatic cassette changers.

It is an object of the invention to mitigate the above problems with a holder of the type defined in the opening paragraph and to provide a holder in which the clamping member does not substantially bulge outwardly from the side wall through which the clamping member extends when the holder contains a cassette. According to the invention this object is achieved in that substantially at the location of its part which projects into the holder interior the clamping member is provided with at least one internal cavity which can take up a part of the elastically deformed material around the cavity. In this way the elastic deformations of the clamping member caused by a cassette inserted into the holder almost wholly occur only at the location of the clamping-member part which projects into the holder interior and little or no elastic deformations occur in the externally visible area of the clamping member, so that the clamping member does not bulge out and its externally visible area is always flush with the side wall it traverses, when the holder contains a cassette. Moreover, the provision of at least one cavity has the advantage that the clamping member is subjected to only comparatively small deformations at the location where it is connected directly to the side wall and is therefore subjected to only comparatively small mechanical loads in this area, which is an advantage in view of a possible lasting connection of the clamping member to the holder, depending on the design of the clamping member.

There are various possibilities for the construction of the clamping member. It may be shaped in various ways and the cavity provided may be for example cylindrical, the cylinder axis extending perpendicularly to the side wall through which the clamping member extends. However, it is found to be advantageous if the clamping member itself is rotationally symmetrical relative to an axis of symmetry perpendicular to the side wall through which the clamping member extends and the cavity is in conformity with the rotational symmetry of the clamping member, is flared towards the holder interior and is open towards the holder interior. A rotationally symmetrical design has the advantage that the clamping member can be mounted simply in an automated mounting process. The flared open cavity in clamping member has the advantage that the clamping member can be manufactured simply, in particular if the clamping member is manufactured as an injection-moulded plastics part. The open conical cavity allows demoulding without any problems.

In the case of a rotationally symmetrical member the cavity may have for example a continuously widening dome shape. It is found to be advantageous if the cavity is conical in view of a simple and low cost manufacture.

In a further advantageous embodiment the part of the clamping member which projects into the holder interior is frustoconical at the exterior. This ensures that this part is easy to insert into and to pass through an opening in the side wall of the holder, which is also advantageous in view of an automated mounting process.

It is found to be advantageous if the clamping member is mirrorsymmetrical relative to a plane of symmetry which extends perpendicularly to the side wall through which the clamping member projects and the cavity in the material is arranged to be mirror-symmetrical relative to the plane of symmetry of the clamping member. Such a clamping member has the advantage that by means of a simple cutting operation it can be manufactured from a commercially available tube, preferably made of silicone rubber.

A further advantageous embodiment is characterized in that at least one cavity is formed by a cylindrical passage which traverses the clamping member in a direction parallel to the side wall through which it extends, the cavity being open at its two axial ends. Thus, at its location where it cooperates with a cassette contained in the holder the clamping member has an imperforate surface, so that the clamping member cooperates with a cassette in a manner which is non-detrimental to either part.

The invention will now be described in more detail on the basis of four exemplary embodiments to which the invention is not limited.

Figure 3:
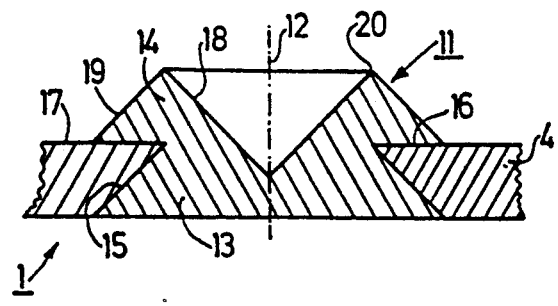
FIG. 3 shows a part of the holder shown in FIGS. 1 and 2 comprising the rotationally symmetrical clamping member in a sectional view taken on the line III—III in FIG. 2 and to a larger scale than in FIG. 2.
Figure 4:
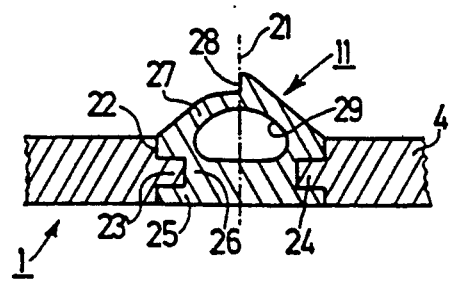

FIG. 4, in the same way as FIG. 3 shows a part of a second embodiment of a holder comprising a mirror-symmetrical clamping member which for its cooperation with a cassette has a stepped clamping zone.

Figure 5:
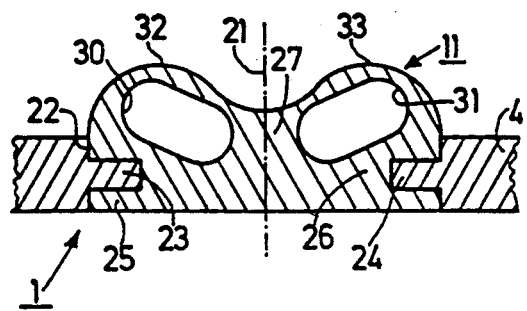

FIG. 5, in the same way as FIGS. 3 and 4, shows a part of a third embodiment of a holder comprising a mirror-symmetrical clamping member having two cavities disposed mirror-symmetrically relative to one another.

Figure 6:
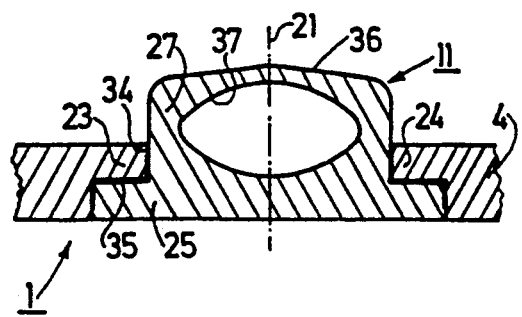

FIG. 6, in the same way as FIGS. 3, 4 and 5, shows a part of a fourth embodiment of a holder comprising a mirror-symmetrical clamping member having a comparatively large clamping zone for the cooperation with a cassette.

Figure 1:
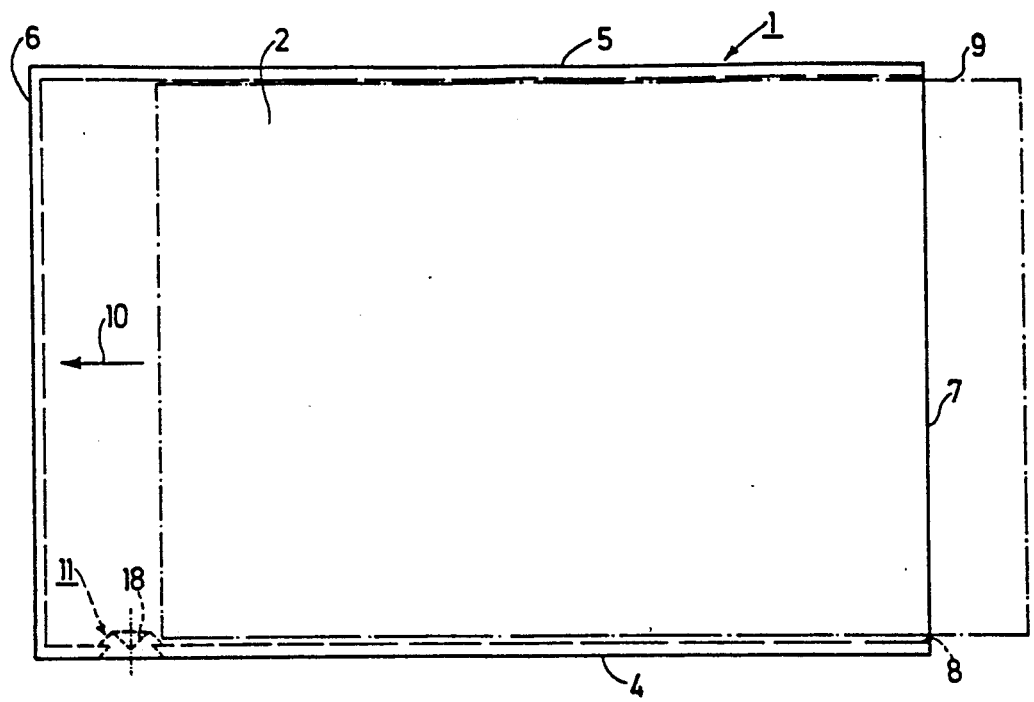
FIG. 1 is an enlarged scale slightly diagrammatical plan view of a first embodiment of the holder which is adapted to receive a cassette containing a magnetic tape and which comprises a rotationally symmetrical clamping member traversing a side wall and having a conical cavity at the location of its part which projects into the holder interior.
Figure 2:
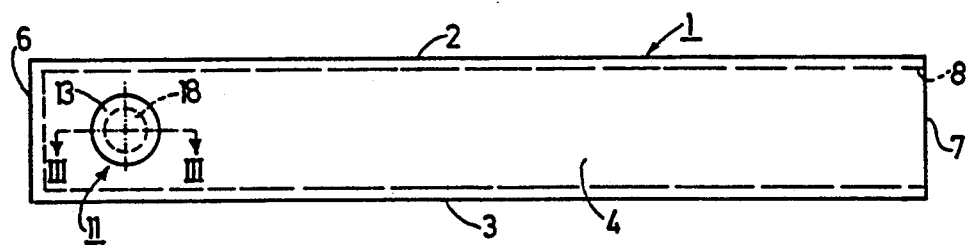
FIG. 2 is a side view at the side wall of the holder shown in FIG. 1, through which side wall the clamping member extends.

FIGS. 1 and 2 show a rectangular holder 1 in accordance with a first embodiment of the invention. The holder 1 is made of a dimensionally stable plastic, for example polycarbonate or acrylonitrile-butadiene styrene. The plastic has a satisfactory shape retention and a high temperature resistance, which is important for a holder of this kind because the holder is often exposed to high thermal loads and large temperature fluctuations. The holder 1 has two main walls, i.e. a top wall 2 and a bottom wall 3. It further comprises three side walls interconnecting the two main walls 2 and 3, i.e. a left-hand side wall 4, a right-side wall 5 and a rear side wall 6. The fourth side 7 of the holder 1 is open, the holder having an opening 8 in this side 7. Through the opening a rectangular cassette 9, shown diagrammatically in dash-dot lines in FIG. 1 and containing a record carrier, in the present case a magnetic tape not shown, can be inserted into the holder. It is to be noted that the holder 1 has a partition, not shown, which separates the cassette-receiving space from a further receiving space adjoining the top wall 2 and adapted to receive a label, and that the top wall 2 has a window, not shown, through which the label in the holder is visible. The partition and the window are not shown in FIGS. 1 and 2 because they are not relevant in the present context.

At the location of the left-hand side wall 4 adjacent the open side 7 the holder 1 comprises a clamping member 11, for clamping a cassette 9 inserted into the holder 1 in the direction indicated by the arrow 10. The clamping member 11 is made of an elastic material, for example silicone rubber in the holder shown in FIGS. 1 to 3. However, the clamping member 11 may alternatively consist of an elastic plastic for example the plastic which is commercially available from Du Pont under the trade name "Hytrel".

In the present case the clamping member 11 is rotationally symmetrical relative to an axis of symmetry 12 which extends perpendicularly to the side wall 4 traversed by the clamping member 11. The clamping member has an externally visible part 13 which is frustoconical. The clamping member 11 also comprises a further part 14 which projects into the holder interior from the side wall 4. This part is frustoconical at the outside. With its externally visible part 13 the clamping member 11 is fitted into an opening 15 in the side wall 4 of the holder 1, which opening has a shape corresponding to the frustoconical shape of this part 13, an annular bounding surface 16 of the frustoconical further part 14 of the clamping member 11 engaging with the inner surface 17 of the side wall 4,. The double frustoconical construction of the clamping member 11 has the advantage that the clamping member can be simply inserted from the outside into and pressed through the opening 15, which is particularly favourable for an automated mounting process. It further ensures that the clamping member is firmly secured to the side wall 4 in that it is snap-mounted, no additional adhesive connection or ultrasonic weld being necessary.

A cassette inserted into the holder 1 can partly deform the clamping member elastically via the part 14 which projects into the holder interior. When a cassette 9 is inserted into the holder 1 in the direction indicated by the arrow 10 the clamping member 11 is partly deformed elastically, which produces a clamping action to retain a cassette which has been inserted completely into the holder.

At the location of its part 14 the clamping member 11 is suitably formed with a cavity 18 in the material of the clamping member, which cavity 18 can take up a part of the material of the clamping member 11 around the cavity when the holder 1 contains a cassette 9. In the present case the cavity 18 is a cavity in accordance with the rotational symmetry of the clamping member, which cavity widens and is open towards the holder interior and in this case has a conical shape. Such a conical cavity 18 advantageous for the manufacture of the clamping member 11 because it allows demoulding without problems and simple low cost production. The cavity 18 is an internal cavity formed in the clamping material, i.e. the cavity is situated within the volume occupied by the clamping member.

In the transitional area between the internal cavity 18 in the clamping member material and the frustoconical external surface 19 of the clamping member 11 the clamping member has a comparatively sharp-edged circular clamping zone 20, which is found to be advantageous for retaining a cassette by clamping. This is particularly so if at the location of the side wall situated at the cassette side and opposite the side wall 4 the cassette has a stepped portion behind which the comparatively sharp-edged clamping zone 20 is engageable.

By providing an internal cavity in the clamping member material, which cavity may take up at least a part of the elastically deformed material of the clamping member around the cavity when the holder contains a cassette, it is advantageously achieved that the elastic deformations of the clamping member almost wholly occur only at the location of the clamping-member part which projects into the holder interior. In this way it is achieved that no substantial elastic deformations occur in the externally visible area of the clamping member, so that the clamping member does not bulge out relative to the side wall it traverses, but its externally visible area stays substantially flush with the side wall it traverses, also when the holder contains a cassette. This is advantageous in view of an effective stacking and storage of a plurality of such holders in a given arrangement, in view of a lasting connection of the clamping member to the holder, and in view of a satisfactory appearance of the holder.

In the part of the holder 1 shown in FIG. 4 a clamping member 11 is connected to and traverses the side wall the clamping member being essentially mirror-symmetrical relative to a plane of symmetry 21 perpendicular to the side wall. The clamping member 11 is mounted in a cross-sectionally rectangular opening 22 into which two ridges 23 and 24 project from the side wall 4. The clamping member 11 has a cross-sectionally rectangular first part 25, a cross-sectionally rectangular second part 26 situated between the two ridges 23 and 24, and a substantially roof-shaped third part 27 which projects into the holder interior from the side wall 4. The roof-shaped part 27 has a stepped portion 28 which in principle forms the clamping zone of the clamping member and is adapted to engage behind a corresponding stepped portion provided at the location of the corresponding side wall of a cassette inserted in the holder. The two ridges 23 and 24 and the corresponding shape of the clamping member 11 provide a snap-mounting by which the clamping member 11 is secured to the side wall 4 of the holder 1.

The clamping member 11 of the holder 1 shown in FIG. 4 has a cavity 29 which is mirror-symmetrical relative to the plane of symmetry 21 of the clamping member 11. In the present case the cavity 29 is formed by a cylindrical passage which traverses the clamping member 11 in a direction parallel to the side wall 4 and is open at its two axial ends. In this case the elastic deformations of the clamping member 11 caused by a cassette inserted into the holder almost wholly occur only at the location of the part which projects into the holder interior, the material which is displaced by the cassette being pressed into the cavity 29 so that the first part 25 and the second part 26 as well as the portions of the third part 27 of the clamping member 11 which border on the ridges 23 and 24 are substantially exempt from deformation, which is advantageous for a reliable mounting of the clamping member 11 in the opening 22. Thus, it is again achieved that the first part 25 of the clamping member 11 remains substantially flush with the side wall 4 when the holder 1 contains a cassette.

The clamping member 11 of the holder 1 which is shown partly in FIG. 5, similarly to that of the holder shown in FIG. 4, is mirrorsymmetrical relative to a plane of symmetry 21. In the holder shown in FIG. 5 the clamping member 11 is secured in substantially the same way as the clamping 11 in the holder shown in FIG. 4. The clamping member 11 of the holder shown in FIG. 5 has two cavities 30 and 31, which are disposed mirror-symmetrically relative to the plane of symmetry 21 of the clamping member 11. The two cavities 30 and 31, in the same way as in the clamping member of the holder shown in FIG. 4 are each formed by a cylindrical passage which traverses the clamping member 11 in a direction parallel to the side wall 4 through which it extends, which is open at its two axial end zones, and which is radially surrounded with clamping-member material. The clamping member 11 of the holder 1 shown in FIG. 5 has two spaced-apart clamping zones 32 and 33. This clamping member is also substantially exempt from externally visible deformations when the holder contains a cassette.

The holder 1 shown partly in FIG. 6 has a clamping member 11 which is mirror-symmetrical relative to a plane of symmetry 21. In this case the clamping member is mounted in a stepped recess 34 in which the clamping member 11 is secured by means of a layer of adhesive represented by a heavy line 35. Alternatively, the clamping member may be secured to the side wall 14 of the holder 1 shown in FIG. 6 by ultrasonic welding. In contrast with the clamping member 11 of the holder 1 shown in FIG. 5, which has two spaced-apart clamping zones 32 and 33, the clamping member 11 of the holder 1 shown in FIG. 6 has only one clamping zone 36, which suitably has a comparatively large surface area. The clamping member 11 of the holder 1 shown in FIG. 6 has only one cavity 37 formed by a cylindrical passage whose cross-sectional dimension is correspondingly larger than each of the two cylindrical passages in the clamping member of the holder shown in FIG. 5. When the holder shown in FIG. 6 contains a cassette its clamping member neither produces any externally visible deformations.

A variety of modifications to the embodiments shown are possible. For example, instead of a conical cavity which is open towards the holder interior a dome-shaped cavity which is open towards the holder interior may be formed in a rotationally symmetrical clamping member. Moreover, more than two cavities in the form of comparatively narrow ducts may be provided in a mirror-symmetrical clamping member. Likewise, the clamping zone of a clamping member intended for cooperation with a cassette contained in a holder may be, for example, sawtooth-shaped.

I claim:

1. A holder of rectangular shape which comprises two main walls and three side walls interconnecting the two main walls and is open at a fourth side, which holder is adapted to receive through the open side a rectangular cassette with a record carrier contained therein and at the location of at least one side wall adjacent the open side comprises a clamping member for clamping a cassette inserted in the holder, which clamping member is connected to the holder at the location of said side wall, traverses said side wall, and comprises a part which projects into the holder interior, which member is made of an elastic material and can be partly deformed elastically by a cassette inserted in the holder, characterized in that substantially at the location of its part which projects into the holder interior the clamping member is provided with at least one cavity which can take up a part of elastically deformed material around the cavity.

2. A holder as claimed in claim 1, characterized in that the clamping member is rotationally symmetrical relative to an axis of symmetry perpendicular to the side wall through which the clamping member extends and the cavity is in conformity with the rotational symmetry of the clamping member, is flared towards the holder interior and is open towards the holder interior.

3. A holder as claimed in claim 2, characterized in that the cavity is conical.

4. A holder as claimed in claim 3, characterized in that the part of the clamping member which projects into the holder interior is frustoconical at the clamping-member exterior.

5. A holder as claim in claim 2, characterized in that the part of the clamping member which projects into the holder interior is frustoconical at the clamping-member exterior.

6. A holder as claim in claim 1, characterized in that the clamping member is mirror-symmetrical relative to a plane of symmetry which extends perpendicularly to the side wall through which the clamping member projects and the cavity is arranged to be mirror-symmetrical relative to the plane of symmetry of the clamping member.

7. A holder as claimed in claim 6, characterized in that the at least one cavity is formed by a cylindrical passage which traverses the clamping member in a direction parallel to the side wall through which it extends, which is open at its two axial end zones, and which is radially surrounded with clamping-member material.

* * * * *